United States Patent
Pedagadi et al.

(10) Patent No.: US 12,273,574 B2
(45) Date of Patent: *Apr. 8, 2025

(54) METHODS AND SYSTEMS FOR UTILIZING LIVE EMBEDDED TRACKING DATA WITHIN A LIVE SPORTS VIDEO STREAM

(71) Applicant: STATS LLC, Chicago, IL (US)

(72) Inventors: Sateesh Pedagadi, London (GB); Johannes Kuehnel, Graz (AT); Bradford Griffiths, London (GB); Christian Marko, Graz (AT); Raphael Reiners, Munich (DE); Brian Orefice, Chicago, IL (US); Patrick Joseph Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,051

(22) Filed: Dec. 29, 2023

(65) Prior Publication Data

US 2024/0137588 A1    Apr. 25, 2024

Related U.S. Application Data

(63) Continuation of application No. 17/821,002, filed on Aug. 19, 2022, now Pat. No. 11,902,603.

(60) Provisional application No. 63/260,482, filed on Aug. 20, 2021.

(51) Int. Cl.
*H04N 21/236* (2011.01)
*H04N 21/2187* (2011.01)
*H04N 21/234* (2011.01)
*H04N 21/431* (2011.01)

(52) U.S. Cl.
CPC ... *H04N 21/23614* (2013.01); *H04N 21/2187* (2013.01); *H04N 21/23418* (2013.01); *H04N 21/4312* (2013.01)

(58) Field of Classification Search
CPC ......... H04N 21/23614; H04N 21/2187; H04N 21/23418; H04N 21/4312; H04N 21/43074; H04N 21/4348; H04N 21/4884; H04N 21/8133
See application file for complete search history.

(56) References Cited

U.S. PATENT DOCUMENTS

| | | |
|---|---|---|
| 11,468,678 B2 | 10/2022 | Pelzer |
| 11,902,603 B2 * | 2/2024 | Pedagadi ........... H04N 21/8133 |
| 2002/0078446 A1 | 6/2002 | Dakss et al. |

(Continued)

OTHER PUBLICATIONS

PCT International Application No. PCT/US22/40899, International Search Report and Written Opinion of the International Searching Authority, dated Jan. 23, 2023, 8 pages.

*Primary Examiner* — John R Schnurr
(74) *Attorney, Agent, or Firm* — Bookoff McAndrews, PLLC

(57) ABSTRACT

A computing system receives a video stream of a game. The computing system generates tracking data corresponding to the video stream using one or more artificial intelligence models. The computing system generates interactive video data by combining the video stream of the game with the tracking data. The computing system causes a media player to render graphics corresponding to the tracking data over the video stream by sending the interactive video data to a client device executing the media player.

20 Claims, 5 Drawing Sheets

(56) References Cited

U.S. PATENT DOCUMENTS

| | | |
|---|---|---|
| 2016/0101358 A1 | 4/2016 | Ibrahim et al. |
| 2017/0238055 A1 | 8/2017 | Chang et al. |
| 2018/0082123 A1 | 3/2018 | Katz et al. |
| 2018/0123711 A1 | 5/2018 | Kitazato et al. |
| 2018/0146264 A1 | 5/2018 | Wolf et al. |
| 2019/0222776 A1 | 7/2019 | Carter et al. |
| 2019/0228306 A1 | 7/2019 | Power et al. |
| 2019/0253747 A1 | 8/2019 | Ramaswamy et al. |
| 2020/0107075 A1 | 4/2020 | Davies et al. |
| 2021/0031105 A1 | 2/2021 | Ganschow et al. |
| 2021/0168411 A1 | 6/2021 | Akiyama et al. |
| 2022/0053245 A1 | 2/2022 | Guez et al. |
| 2022/0108112 A1 | 4/2022 | Ottenwess et al. |

* cited by examiner

METHODS AND SYSTEMS FOR UTILIZING LIVE EMBEDDED TRACKING DATA WITHIN A LIVE SPORTS VIDEO STREAM

CROSS-REFERENCE TO RELATED APPLICATIONS

This application is a continuation of, and claims the benefit of priority to, U.S. application Ser. No. 17/821,002, filed Aug. 19, 2022, which claims priority to U.S. Provisional Application Ser. No. 63/260,482, filed Aug. 20, 2021, the entireties of which are incorporated herein by reference.

FIELD OF THE DISCLOSURE

The present disclosure generally relates to system and method for generating live tracking data and embedding the live tracking data within a live sports video stream.

BACKGROUND

Increasingly, users are opting to forego a traditional cable subscription in favor of one of the various streaming services and/or over-the-top (OTT) media services readily available today. With this shift, leagues across a variety of sports have become more interested in contracting with one of these streaming services for providing their content to end users.

SUMMARY

In some embodiments, a method is disclosed herein. A computing system receives a video stream of a game in real-time or near real-time. The computing system generates tracking data corresponding to the video stream using one or more artificial intelligence models. The computing system generates interactive video data by combining the video stream of the game with the tracking data. The computing system causes a media player to render graphics corresponding to the tracking data over the video stream by sending the interactive video data to a client device executing the media player in real-time or near real-time.

In some embodiments, a non-transitory computer readable medium is disclosed herein. The non-transitory computer readable medium includes one or more sequences of instructions, that, when executed by one or more processors, causes a computing system to perform operations. The operations include receiving, by the computing system, a video stream of a game. The operations further include generating, by the computing system, tracking data corresponding to the video stream using one or more artificial intelligence models. The operations further include generating, by the computing system, interactive video data by combining the video stream of the game with the tracking data. The operations further include causing, by the computing system, a media player to render graphics corresponding to the tracking data over the video stream by sending the interactive video data to a client device executing the media player.

In some embodiments, a system is disclosed herein. The system includes a processor and a memory. The memory has programming instructions stored thereon, which, when executed by the processor, causes a computing system to perform operations. The operations include receiving a video stream of a game. The operations further include generating tracking data corresponding to the video stream using one or more artificial intelligence models. The operations further include generating interactive video data by combining the video stream of the game with the tracking data. The operations further include causing a media player to render graphics corresponding to the tracking data over the video stream by sending the interactive video data to a client device executing the media player.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
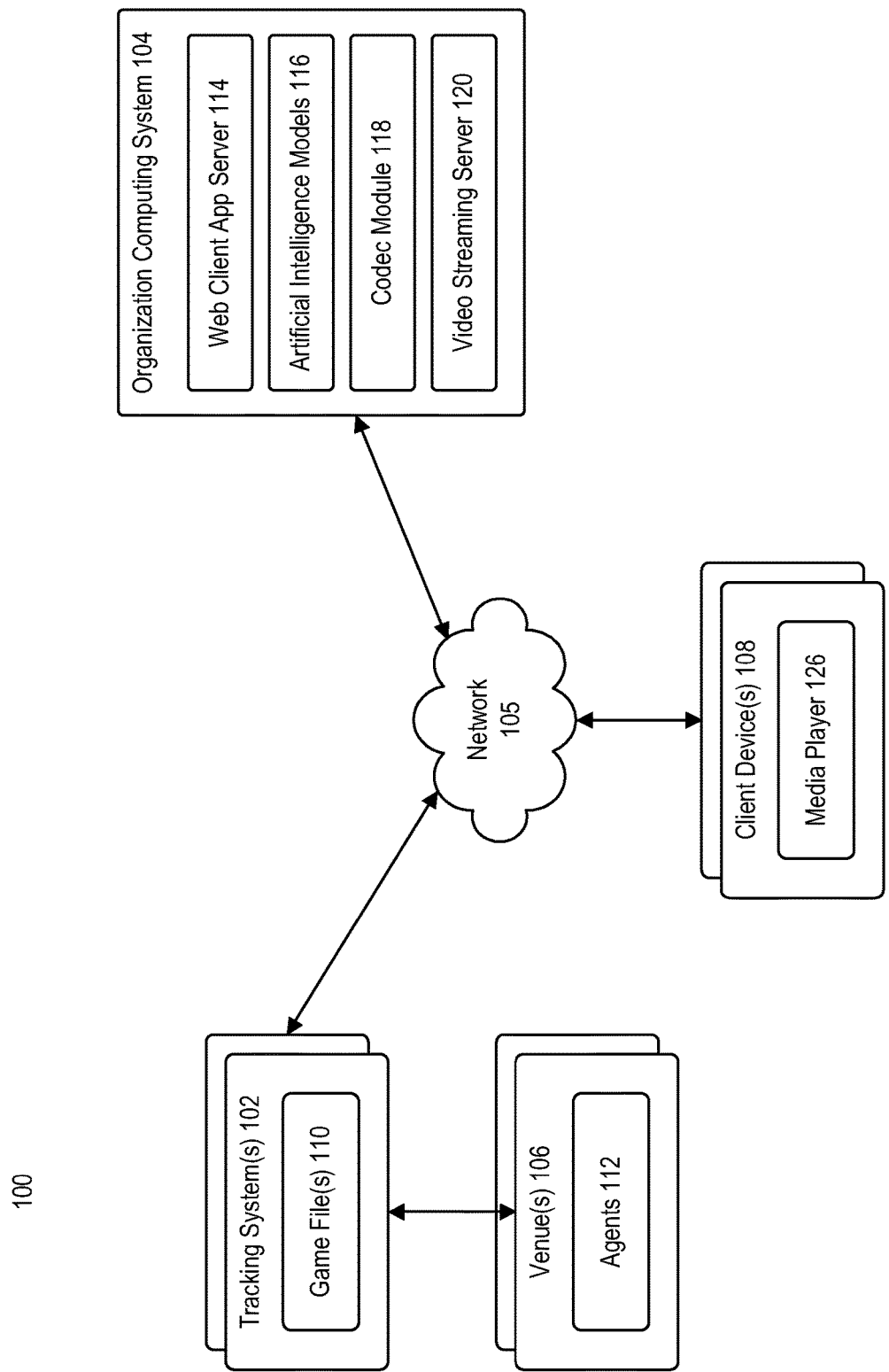
FIG. 1 is a block diagram illustrating a computing environment, according to example embodiments.

Current methods of utilizing tracking data in sports involves generating a separate meta-data file of the tracking data and distributing the separate meta-data file to clients. Clients, in turn, then merge the separate metadata file with a separate video data stream and performs various transformations to the merged data so that the merged data is in a structure required by downstream applications. Such process introduces an additional delay, which often induces significant latency, thus prohibiting the use of tracking data for live applications. Further, conventional operators recognize this limitation and often generates the tracking data at a delay to incorporate human clean-up tasks or cloud-based processing, which further compounds or increases the delay. Still further, combining or merging multiple data sources (e.g., tracking data with video) data is not a trivial task. Instead, such combining or merging is a complex and difficult process that conventional systems are not able to perform.

To improve upon conventional systems, the present techniques provide a system and method of utilizing live tracking data collected from a live video of a sporting event. The present system may utilize a method of generating live tracking data based on a stream of video (e.g., broadcast video stream, over-the-top (OTT) media service, etc.) and embeds this tracking data as metadata into the sub-title stream of the live video. In this manner, the present system may combine tracking data with live streaming data of the sporting event for various downstream applications.

To process this combined signal, one or more techniques disclosed herein provide a novel web-based player. The web-based player may enable live interactivity of the video stream. For example, via the web-based player, a user may be provided with a top-down view of the teams' structures. In some embodiments, the web-based player may support user input via one or more input devices or one or more gesture-based inputs. For example, via the web-based player, a user can touch a region of the display that includes a player, and the system may surface pertinent information about that player.

Additionally, the present system may be configured to synchronize the tracking data with streaming video data on a frame-by-frame basis. For sports, such as soccer and basketball, synchronizing the tracking data to the precise frame and game-time is critical because successful synchronization may enable other forms of metadata to be generated. For example, additional data may be generated by human operators at a relatively low latency (e.g., 10 seconds). Such additional data may be embedded into the video stream at a later point in time. Moreover, human operators can utilize the live stream with embedded tracking data to capture high-level events, such as passes in soccer, and can merge those high-level events with the player tracking data to obtain precise locations and frames where these events occurred.

Further, one or more techniques provided herein may enable predictive gamification experiences for live sports. For sports, such as tennis, cricket, and soccer, for example, the merging of tracking data with streaming video data can provide users with an interactive gaming experience, in which users touch an area of a future event to occur. In some embodiments, such combination of tracking data with streaming video data can provide frame-level synchrony to ensure that the window of selection is valid.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a streaming feed of a given match. Exemplary streams may include, but are not limited to, broadcast stream, panoramic stream, tactical stream, and the like. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. For example, tracking system 102 may be configured to provide organization computing system 104 with a stream of a game or event in real-time or near real-time via network 105. Organization computing system 104 may be configured to process the stream of the game and provide interactive broadcast video data to client devices 108. Organization computing system 104 may include at least a web client application server 114, one or more artificial intelligence models 116, a codec module 118, and a video streaming server 120. Each of one or more artificial intelligence models 116 and codec module 118 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

One or more artificial intelligence models 116 may be configured to analyze streams provided by tracking system 102. For example, one or more artificial intelligence models 116 may be configured to analyze, in real-time or near real-time, streams provided by tracking system 102 and generate tracking data (e.g., "metadata") for inclusion in an annotated stream. Exemplary metadata may include, but is not limited to, one or more of player and ball positional an tracking data in the video and real world plane, game clock and scoreboard data, event data (e.g., passes, shots, tackles, and the like), derived modelled data (e.g., passing options, pressure, and the like), team biographical and career data (e.g., historical performance, player appearance, and the like).

Exemplary AI models may include, but are not limited to, event detection models, such as that described in U.S. application Ser. No. 16/254,128, which is hereby incorporated by reference in its entirety, a player reidentification model, such as that described in U.S. Pat. No. 11,176,411, which is hereby incorporated by reference in its entirety; player tracking models, such as those described in U.S. Pat. Nos. 11,182,642 and 11,379,683, which are hereby incorporated by reference in their entireties; moving camera calibration models, such as those described in U.S. application Ser. No. 16/805,157 and U.S. application Ser. No. 17/226,205, which are hereby incorporated by reference in their entireties, body-pose analysis model, such as that described in U.S. application Ser. No. 16/804,964, which is hereby incorporated by reference in its entirety.

Codec module 118 may be configured to merge the tracking data with the corresponding video frames of the stream to generate an annotated video to be provided to client devices 108. For example, codec module 118 may multiplex the video data with the tracking data generated by one or more artificial intelligence models 116 to generate a multiplexed data packet (e.g., annotated stream). In some embodiments, such multiplexing process may enable synchronized packet level mapping of compressed video and tracking data as a subtitle track within the video to be provided to client device 108. In some embodiments, such multiplexing process may enable synchronized packet level mapping of compressed video and tracking data as a metadata track within the video to be provided to client device 108. In some embodiments, the tracking data may be in the form of a JavaScript Object Notation (JSON) file. Codec module 118 may compress the video data. For example, codec module 118 may compress the video data using H.264 technology. Codec module 118 may generate a JSON file of the tracking data for inclusion with the video data. For example, codec module 118 may generate a UTF-8 encoded JSON packet that includes the tracking data for video frames in the video data. In this manner, when the annotated video is provided to client device 108, client device 108 may unpack the JSON document for subtitle events or metadata events and may render data on the video.

Video streaming server 120 may be configured to send the annotated video data to client device 108. For example, video streaming server 120 may send the multiplexed data (e.g., an RTP packet) to client device 108. Video streaming server 120 may be representative of one or more computing systems capable of supporting a protocol for client playback. In some embodiments, video streaming server 120 may be representative of a hypertext transfer protocol (HTTP) live streaming (HLS) server.

Client device 108 may be in communication with organization computing system 104 via network 105. Client device 108 may be operated by a user. For example, client device 108 may be a mobile device, a tablet, a desktop computer, a set-top box, a streaming player, or any computing system capable of receiving, rendering, and presenting video data to the user. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least media player 126. Media player 126 may be representative of a web-based player configured to receive and render video data. For example, upon receipt of the multiplexed data, media player 126 may unpack the JSON file for subtitle events or metadata events and may render the data on the video data. In some embodiments, media player 126 may be representative of a HTML5 video player configured to support video, audio, and subtitle handling.

Figure 2:
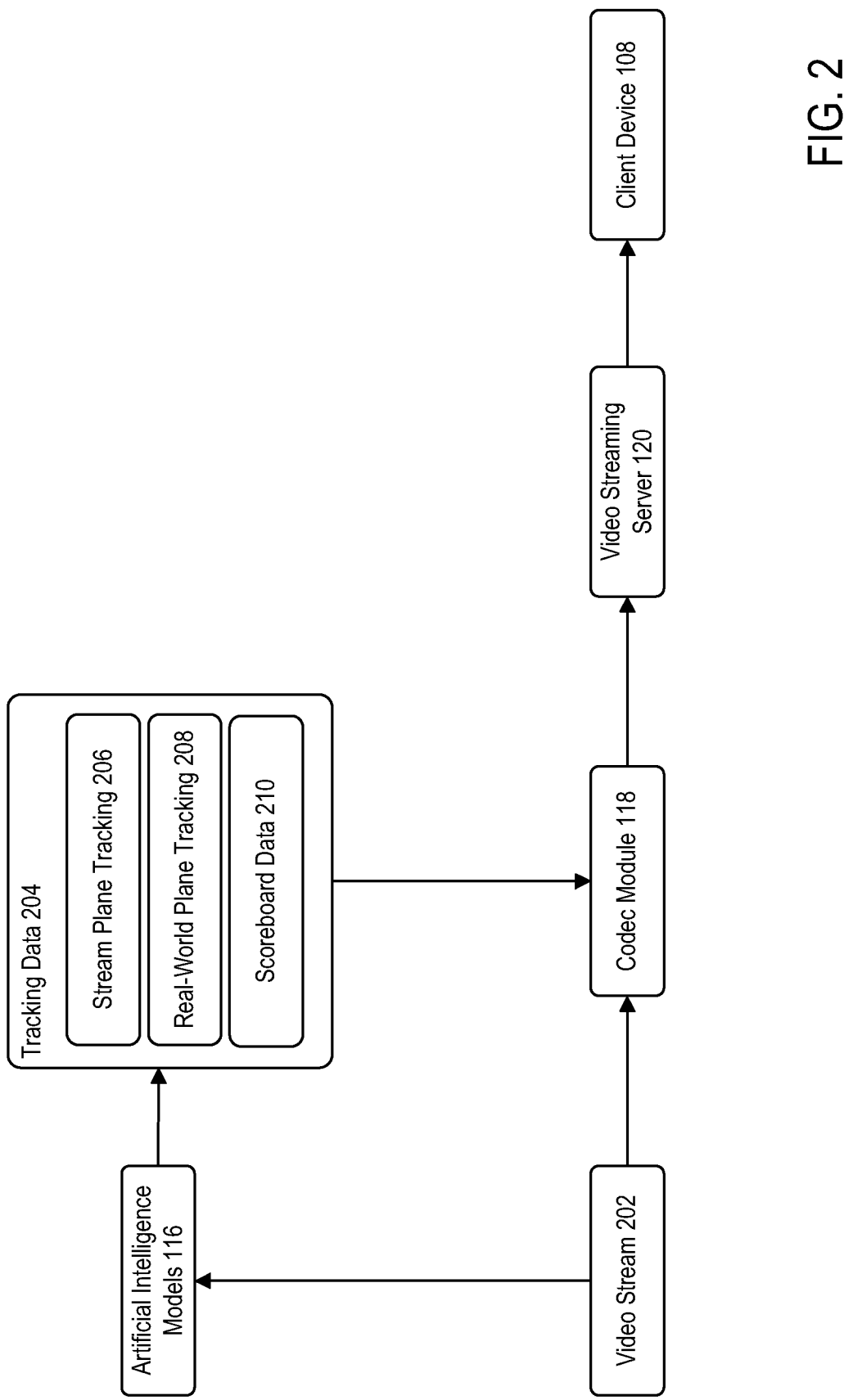
FIG. 2 is a block diagram that illustrates exemplary components of computing system, according to example embodiments.

FIG. 2 is a block diagram that illustrates exemplary components of computing environment 100, according to example embodiments. As shown, a video stream 202 may be provided to computing system 104. In some embodiments, video stream 202 may be provided by tracking system 102.

Video stream 202 may be provided to one or more artificial intelligence models 116 for analysis. For example, one or more artificial intelligence models 116 may apply one or more machine learning and/or computer vision techniques to video stream 202 to generate tracking data 204 (e.g., metadata) for inclusion into video data to be provided to client device 108. As shown, tracking data 204 may include, but is not limited to, image plane/stream plane tracking 206, real-world plane tracking 208, and/or scoreboard data 210. Such tracking data 204 may be stored in a JSON file.

In some embodiments, image plane/stream plane tracking 206 may include model output data generated from inferencing the video frames of video stream 202. The image plane data may include player and ball locations within the video frame dimensions. Once these locations are detected, the entities may be tracked over time as the camera moves (e.g., broadcast camera is not fixed as it follows the action and the players). Real-world plane tracking 208 may correspond to the process of projecting the detected entities in image plane dimensions to real-world coordinates. In other words, real-world plane tracking may correspond to the projection used to create a bird's eye view of the action with the dimensions of the court/pitch. For example, input frame dimensions may be 1280×720; in some embodiments, every player detected and tracked may be projected onto a 105×68 meter sized football pitch on ground plane. Once on the ground plane, tracking may be performed in order to further enrich data quality.

Video stream 202 and tracking data 204 may be provided to codec module 118. Codec module 118 may synchronize tracking data 204 with video stream 202 to generate annotated video data to be provided to client device 108. In some embodiments, codec module 118 may synchronize tracking data 204 with video stream 202 at a frame level, thereby delivering tracking data 204 to client device 108 as part of the video stream itself. In some embodiments, codec module 118 may utilize multi-track synchronization.

Codec module 118 may provide the annotated video data to video streaming server 120. Video streaming server 120 may provide the annotated video data to media player 126 executing on client device 108. Media player 126 may be configured to unpack the JSON file for subtitle events or metadata events and may render the data on the video data. Exemplary renderings may include, but is not limited to, scoreboard overlay, box players (e.g., video augmentation), 2D pitch overlay (e.g., animation/recreation), and the like).

Figure 3:
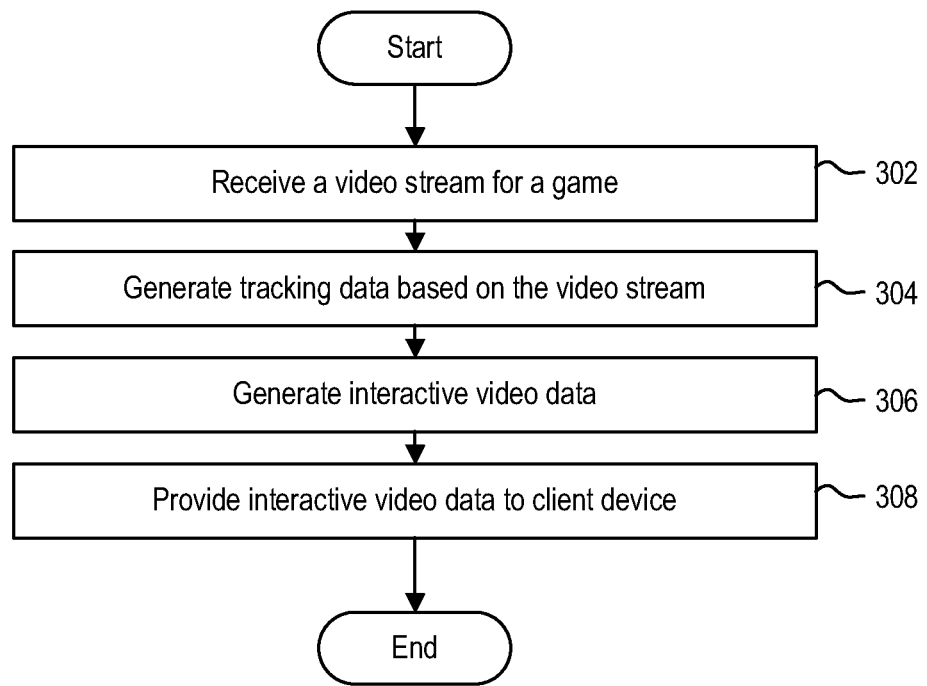
FIG. 3 is a flow diagram illustrating a method of generating interactive video data, according to example embodiments.

FIG. 3 is a flow diagram illustrating a method 300 of generating interactive video data, according to example embodiments. Method 300 may begin at step 302.

At step 302, organization computing system 104 may receive a video stream (e.g., broadcast video stream, tactical stream, panoramic stream, etc.) for a game or event. In some embodiments, video stream may be provided by tracking system 102. In some embodiments, the video stream may be provided in real-time or near real-time.

At step 304, organization computing system 104 may generate tracking data based on the received video stream. For example, one or more artificial intelligence models 116 may apply one or more machine learning and/or computer vision techniques to video stream 202 to generate tracking data 204 (e.g., metadata) for inclusion into video data to be provided to client device 108.

At step 306, organization computing system 104 may generate interactive video data based on the video stream and the tracking data. Codec module 118 may synchronize tracking data 204 with video stream 202 to generate annotated video data to be provided to client device 108. In some embodiments, codec module 118 may synchronize tracking data 204 with video stream 202 at a frame level, thereby delivering tracking data 204 to client device 108 as part of the video stream itself. In some embodiments, codec module 118 may utilize multi-track synchronization.

At step 308, organization computing system 104 may provide interactive video data to client device 108 for presentation thereon. For example, video streaming server 120 may provide the annotated video data to media player 126 executing on client device 108. Media player 126 may be configured to unpack the JSON file for subtitle events or metadata events and may render the data on the video data. Exemplary renderings may include, but is not limited to, scoreboard overlay, box players (e.g., video augmentation), 2D pitch overlay (e.g., animation/recreation), and the like).

Figure 4:
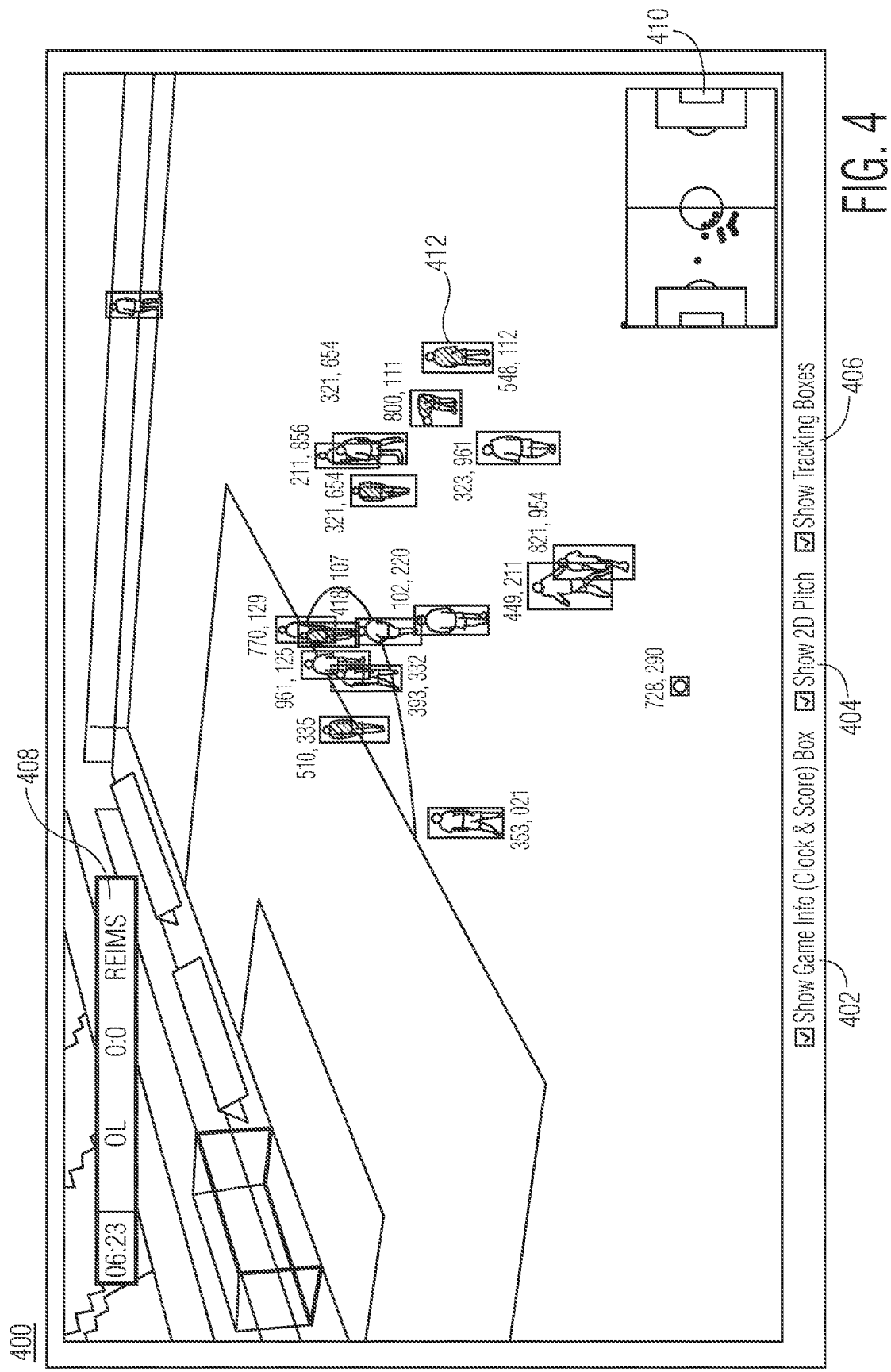
FIG. 4 illustrates an exemplary graphical user interface for providing interactive video data, according to example embodiments.

FIG. 4 illustrates an exemplary graphical user interface (GUI) 400 displayed via media player 126, according to example embodiments. A shown, GUI 400 may provide real-time or near-real time graphics corresponding to an event currently taking place. Media player 126 may render GUI 400 by unpacking JSON for subtitle events or metadata events and rendering data corresponding to the subtitle events or metadata events over or on the video data. In some embodiments, such rendering may be initiated by the end user. For example, as illustrated GUI 400 may include one or more graphical elements 402-406. Each graphical element 402-406 may correspond to a type of subtitle events or metadata events that may be rendered over or on the video data. For example, as shown, graphical element 402 may correspond to an option to show game information (e.g., clock and score), graphical element 404 may correspond to showing a 2D pitch, and graphical element 406 may correspond to showing tracking boxes. When any of graphical elements 403-406 are selected, media player 126 may render the corresponding graphical elements. For example, as shown, scoreboard 408 may be rendered responsive to a user selecting graphical element 402. In another example, 2D pitch 410 may be rendered responsive to a user selecting graphical element 404. In another example, bounding boxes 412 may be rendered around each player responsive to a user selecting graphical element 406. In this manner, a user may be provided with interactive video data.

Figure 5A:
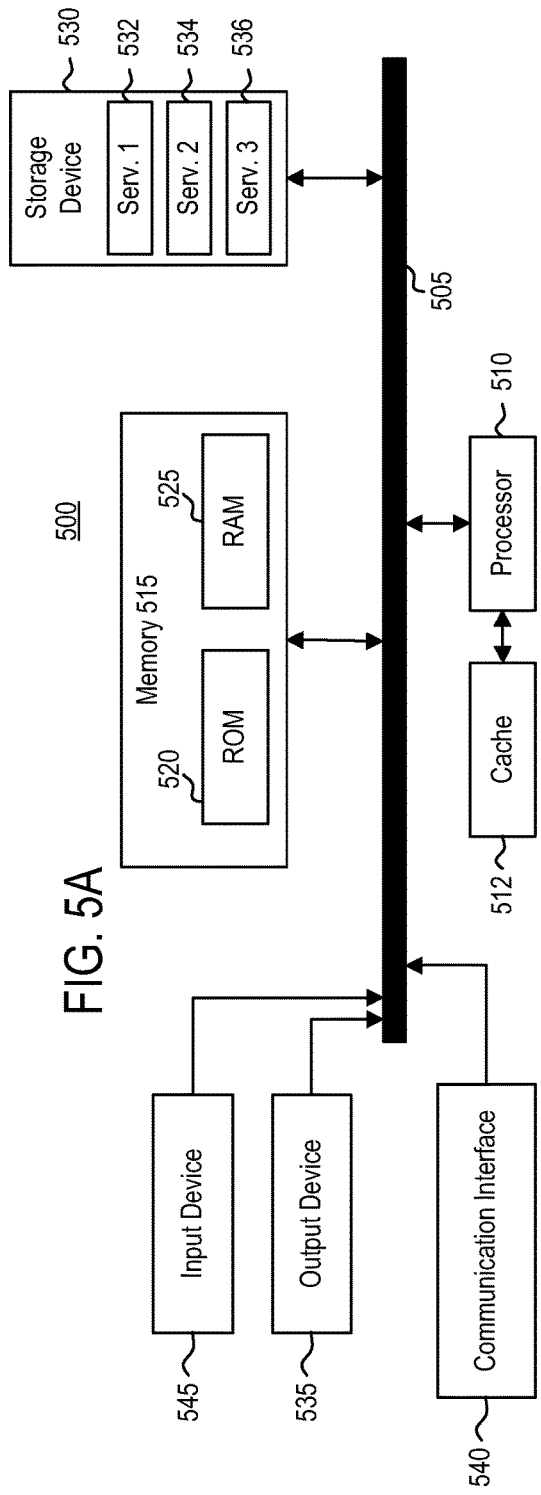
FIG. 5A is a block diagram illustrating a computing device, according to example embodiments.

FIG. 5A illustrates an architecture of computing system 500, according to example embodiments. System 500 may be representative of at least a portion of organization computing system 104. One or more components of system 500 may be in electrical communication with each other using a bus 505. System 500 may include a processing unit (CPU or processor) 510 and a system bus 505 that couples various system components including the system memory 515, such as read only memory (ROM) 520 and random access memory (RAM) 525, to processor 510. System 500 may include a cache of high-speed memory connected directly with, in close proximity to, or integrated as part of processor 510. System 500 may copy data from memory 515 and/or storage device 530 to cache 512 for quick access by processor 510. In this way, cache 512 may provide a performance boost that avoids processor 510 delays while waiting for data. These and other modules may control or be configured to control processor 510 to perform various actions. Other system memory 515 may be available for use as well. Memory 515 may include multiple different types of memory with different performance characteristics. Processor 510 may include any general purpose processor and a hardware module or software module, such as service 1 532, service 2 534, and service 3 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system 500, an input device 545 may represent any number of input mechanisms, such as a microphone for speech, a touch-sensitive screen for gesture or graphical input, keyboard, mouse, motion input, speech and so forth. An output device 535 (e.g., display) may also be one or more of a number of output mechanisms known to those of skill in the art. In some instances, multimodal systems may enable a user to provide multiple types of input to communicate with computing system 500. Communications interface 540 may generally govern and manage the user input and system output. There is no restriction on operating on any particular hardware arrangement and therefore the basic features here may easily be substituted for improved hardware or firmware arrangements as they are developed.

Storage device 530 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 may include services 532, 534, and 536 for controlling the processor 510. Other hardware or software modules are contemplated. Storage device 530 may be connected to system bus 505. In one aspect, a hardware module that performs a particular function may include the software component stored in a computer-readable medium in connection with the necessary hardware components, such as processor 510, bus 505, output device 535, and so forth, to carry out the function.

Figure 5B:
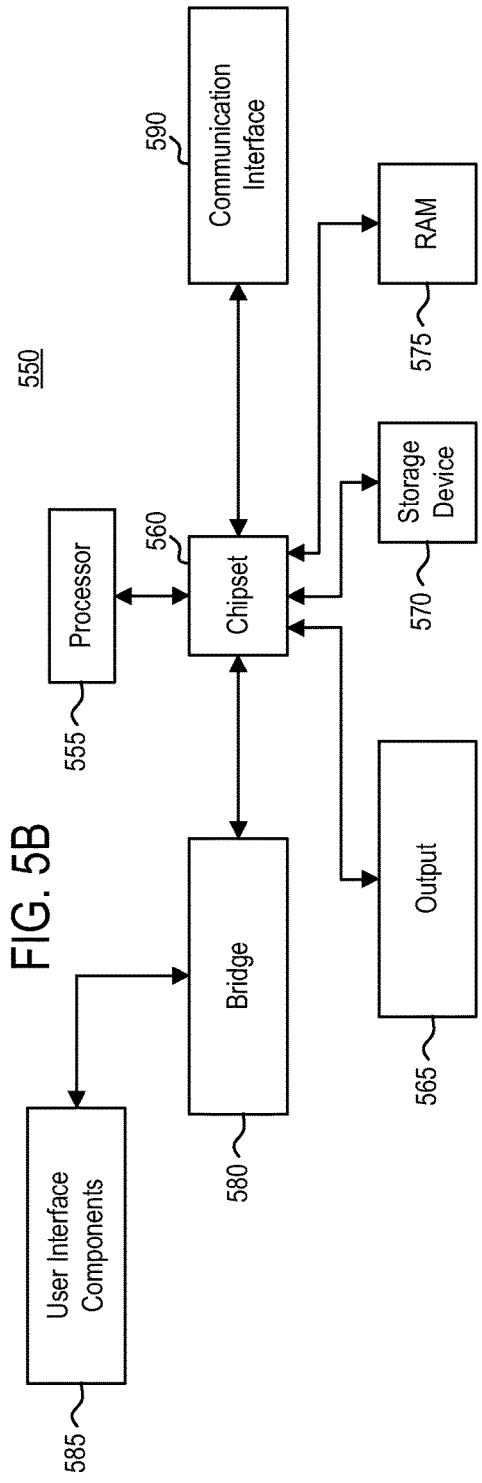
FIG. 5B is a block diagram illustrating a computing device, according to example embodiments.

FIG. 5B illustrates a computer system 550 having a chipset architecture that may represent at least a portion of organization computing system 104. Computer system 550 may be an example of computer hardware, software, and firmware that may be used to implement the disclosed technology. System 550 may include a processor 555, representative of any number of physically and/or logically distinct resources capable of executing software, firmware, and hardware configured to perform identified computations. Processor 555 may communicate with a chipset 560 that may control input to and output from processor 555. In this example, chipset 560 outputs information to output 565, such as a display, and may read and write information to storage device 570, which may include magnetic media, and solid-state media, for example. Chipset 560 may also read data from and write data to RAM 575. A bridge 580 for interfacing with a variety of user interface components 585 may be provided for interfacing with chipset 560. Such user interface components 585 may include a keyboard, a microphone, touch detection and processing circuitry, a pointing device, such as a mouse, and so on. In general, inputs to system 550 may come from any of a variety of sources, machine generated and/or human generated.

Chipset 560 may also interface with one or more communication interfaces 590 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 555 analyzing data stored in storage device 570 or RAM 575. Further, the machine may receive inputs from a user through user interface components 585 and execute appropriate functions, such as browsing functions by interpreting these inputs using processor 555.

It may be appreciated that example systems 500 and 550 may have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method comprising:
   receiving, by a computing system, a video stream of a game;
   receiving, by the computing system, tracking data corresponding to the video stream;
   generating, by the computing system, interactive video data by multiplexing the video stream of the game with the tracking data to create a multiplexed data stream, wherein the multiplexing includes adding a mapping of the tracking data with the video stream to the video stream as a subtitle track within the video stream;
   sending, by the computing system, the interactive video data including the multiplexed data stream to a client device executing a media player; and
   causing, by the computing system, the media player to display one or more graphical elements corresponding to the tracking data over the video stream on a graphical user interface.

2. The method of claim 1, wherein the tracking data corresponding to the video stream is generated by:
   utilizing one or more artificial intelligence models to generate a JavaScript Object Notation (JSON) file comprising the tracking data.

3. The method of claim 2, causing, by the computing system, the media player to display the one or more graphical elements corresponding to the tracking data over the video stream on the graphical user interface comprises:
   identifying, by the computing system, one or more metadata events in the tracking data by causing the client device to unpack a JSON file including the tracking data; and
   causing, by the computing system, the media player to display one or more graphical renderings corresponding to the one more metadata events.

4. The method of claim 3, wherein the one or more graphical renderings include a scoreboard overlay, one or more video augmentations, or one or more two dimensional pitch overlays.

5. The method of claim 1, wherein the tracking data corresponding to the video stream comprises player and ball positional data corresponding to one or more locational coordinates of each player and a ball.

6. The method of claim 1, wherein the tracking data corresponding to the video stream comprises event data based on the tracking data, wherein the event data captures a plurality of events included in the game.

7. The method of claim 1, wherein the multiplexing further includes utilizing one or more artificial intelligence models to perform the multiplexing.

8. A non-transitory computer readable medium comprising one or more sequences of instructions, that, when executed by one or more processors, causes a computing system to perform operations comprising:
   receiving, by a computing system, a video stream of a game;
   receiving, by the computing system, tracking data corresponding to the video stream;
   generating, by the computing system, interactive video data by multiplexing the video stream of the game with the tracking data to create a multiplexed data stream, wherein the multiplexing includes adding a mapping of the tracking data with the video stream to the video stream as a subtitle track within the video stream;
   sending, by the computing system, the interactive video data including the multiplexed data stream to a client device executing a media player; and
   causing, by the computing system, the media player to display one or more graphical elements corresponding to the tracking data over the video stream on a graphical user interface.

9. The non-transitory computer readable medium of claim 8, wherein the tracking data corresponding to the video stream is generated by:
   utilizing one or more artificial intelligence models to generate a JavaScript Object Notation (JSON) file comprising the tracking data.

10. The non-transitory computer readable medium of claim 9, causing, by the computing system, the media player to display the one or more graphical elements corresponding to the tracking data over the video stream on the graphical user interface comprises:
  identifying, by the computing system, one or more metadata events in the tracking data by causing the client device to unpack a JSON file including the tracking data; and
  causing, by the computing system, the media player to display one or more graphical renderings corresponding to the one more metadata events.

11. The non-transitory computer readable medium of claim 10, wherein the one or more graphical renderings include a scoreboard overlay, one or more video augmentations, or one or more two dimensional pitch overlays.

12. The non-transitory computer readable medium of claim 8, wherein the tracking data corresponding to the video stream comprises player and ball positional data corresponding to one or more locational coordinates of each player and a ball.

13. The non-transitory computer readable medium of claim 8, wherein the tracking data corresponding to the video stream comprises event data based on the tracking data, wherein the event data captures a plurality of events included in the game.

14. The non-transitory computer readable medium of claim 8, wherein the multiplexing further includes utilizing one or more artificial intelligence models to perform the multiplexing.

15. A computer system comprising:
a processor; and
a memory having programming instructions stored thereon, which, when executed by the processor, causes a computing system to perform operations comprising:
receiving a video stream of a game;
receiving tracking data corresponding to the video stream;
generating interactive video data by multiplexing the video stream of the game with the tracking data to create a multiplexed data stream, wherein the multiplexing includes adding a mapping of the tracking data with the video stream to the video stream as a subtitle track within the video stream;
sending the interactive video data including the multiplexed data stream to a client device executing a media player; and
causing the media player to display one or more graphical elements corresponding to the tracking data over the video stream on a graphical user interface.

16. The computer system of claim 15, wherein the tracking data corresponding to the video stream is generated by:
  utilizing one or more artificial intelligence models to generate a JavaScript Object Notation (JSON) file comprising the tracking data.

17. The computer system of claim 16, causing the media player to display the one or more graphical elements corresponding to the tracking data over the video stream on the graphical user interface comprises:
  identifying one or more metadata events in the tracking data by causing the client device to unpack a JSON file including the tracking data; and
  causing the media player to display one or more graphical renderings corresponding to the one more metadata events.

18. The computer system of claim 17, wherein the one or more graphical renderings include a scoreboard overlay, one or more video augmentations, or one or more two dimensional pitch overlays.

19. The computer system of claim 15, wherein the tracking data corresponding to the video stream comprises generating player and ball positional data corresponding to one or more locational coordinates of each player and a ball.

20. The computer system of claim 15, wherein the tracking data corresponding to the video stream comprises event data based on the tracking data, wherein the event data captures a plurality of events included in the game.

* * * * *